United States Patent [19]

Tozune et al.

[11] Patent Number: 4,987,156

[45] Date of Patent: Jan. 22, 1991

[54] SHOCK-ABSORBING POLYURETHANE FOAM AND PRODUCTION PROCESS THEREOF

[75] Inventors: Sigeru Tozune, Sano; Shizuo Yamazaki, Oora; Ryuichi Komori, Koga; Masashi Ishii, Wako; Yoshio Sakaguchi, Wako; Tetsuya Oda, Wako, all of Japan

[73] Assignees: Achilles Corporation; Honda Giken Kogyo Kabushiki Kaisha, both of Tokyo, Japan

[21] Appl. No.: 361,290

[22] Filed: Jun. 5, 1989

[30] Foreign Application Priority Data

Jun. 4, 1988 [JP] Japan .................... 63-137650
May 18, 1989 [JP] Japan .................... 1-125535

[51] Int. Cl.$^5$ ........................... C08G 18/14
[52] U.S. Cl. ..................... 521/99; 521/107; 521/123; 521/129; 521/130
[58] Field of Search ............ 521/99, 107, 123, 129, 521/130

[56] References Cited

U.S. PATENT DOCUMENTS 4,565,833 1/1986 Buszard et al. .................. 521/107
4,746,682 5/1988 Green ............................... 521/107

*Primary Examiner*—Maurice J. Welsh
*Attorney, Agent, or Firm*—Sherman and Shalloway

[57] ABSTRACT

A shock-absorbing polyurethane foam is formed of a polyol component and a polyisocyanate component. The polyol component is a mixed polyol having an average hydroxyl number of 130–250 and composed at least of 20–70 parts by weight of a low-molecular polyol having a molecular weight of 300–500 and 80–30 parts by weight of a high-molecular polyol having a molecular weight of 1,500–8,000 per 100 parts by weight of the whole polyol component. The foam further contains 5–150 parts by weight of a plasticizer having a solidification point not higher than −20° C. per 100 parts by weight of the whole polyol component. The foam can be produced by reacting the polyol component and polyisocyanate component in the presence of 5–150 parts by weight of the plasticizer per 100 parts by weight of the polyol component.

23 Claims, 2 Drawing Sheets

SHOCK-ABSORBING POLYURETHANE FOAM AND PRODUCTION PROCESS THEREOF

BACKGROUND OF THE INVENTION (1) Field of the Invention

This invention relates to a shock-absorbing polyurethane foam having rather stable physical properties at varied temperatures and low resilience over a wide range of temperatures and useful as a shock-absorbing material, soundproofing material, cushioning material or the like. This invention is also concerned with a process for the production of the shock-absorbing polyurethane foam.

(2) Description of the Related Art

Preferred conventional shock-absorbing materials include (1) polyurethane foams obtained by using polyols, whose average molecular weights range from 700 to 1,000, as polyol components and having reduced resilience and enhanced cushioning properties; (2) acrylic rubber foams formed of copolymers of acrylic esters and acrylonitrile; (3) polyurethane foams obtained by adding asphalt to raw materials for polyurethane foams and then foaming the raw materials along with the asphalt into integral bodies (Japanese Patent Application Laid-Open No. 15433/1984); (4) polyurethane foams obtained by impregnating polyurethane foams with asphalt (Japanese Patent Application Laid-Open No. 152740/1986); (5) polyurethane foams formed of urethane elastomers (Japanese Patent Application Laid-Open No. 54000/1977); (6) polyurethane foams obtained by adding a great deal of oil to ring opening polymerization products of norbornene monomers and then curing the resulting mixtures ["Kogyo Zairyo (Industrial Materials)", 35(2), 1987]; etc.

The foams (1) and (2) have low resilience and exhibit excellent shock-absorbing properties at room temperature. When the temperature rises to about 30° C. and further, their resilience increases so that their shock-absorbing properties are reduced. As the temperature drops, for example, to about 0° C. or still further, they gradually become harder and show physical properties similar to hard polyurethane foams so that shock-absorbing properties cannot be expected any longer.

On the other hand, the polyurethane foams (3) and (4) have been imparted with shock-absorbing properties by asphalt which is a plastic material. When the temperature drops, asphalt, namely, the plastic material becomes harder so that the foams are rendered hard in toto and shock-absorbing properties are no longer expected. When the temperature rises, asphalt becomes softer or flowable. Accordingly, the polyurethane foams exhibit the inherent high resilience which they had before the incorporation of asphalt, leading to a substantial reduction in their shock-absorbing properties. There is a further potential drawback that they may cause a smearing problem due to oozing-out of asphalt rendered flowable.

The polyurethane foams (5) and (6) are elastomers. They are hence accompanied by drawbacks such that they are heavy and moreover expensive.

SUMMARY OF THE INVENTION

The present inventors have carried out an extensive investigation with a view toward providing a solution to the above problems and drawbacks. As a result, it has been found that a polyurethane foam obtained by reacting a mixed polyol as a polyol component of the polyurethane foam with a polyisocyanate in the presence of a specific amount of a plasticizer having a solidification point not higher than −20° C., said mixed polyol containing low-molecular and high-molecular polyols of specific molecular weights at a particular ratio and having an average hydroxyl number of 130–250, exhibits low resilience and has excellent shock-absorbing properties over a wide range of temperatures. It has also been found that upon production of such a polyurethane foam, use of a polyol having a high average hydroxyl number tends to give a closed-cell structure but when a polyol and a polyisocyanate are reacted using a tertiary amine salt of a specific structure as a catalyst, a flexible foam of an open-cell structure is obtained and especially, the presence of calcium carbonate facilitates the formation of a flexible foam of an open-cell structure. The present invention have been completed based on these findings.

In one aspect of this invention, there is thus provided a shock-absorbing polyurethane foam comprising a polyol component. The polyol component is a mixed polyol having an average hydroxyl number of 130–250 and composed at least of 20–70 parts by weight of a low-molecular polyol having a molecular weight of 300–500 and 80–30 parts by weight of a high-molecular polyol having a molecular weight of 1,500–8,000 per 100 parts by weight of the whole polyol component. The foam contains 5–150 parts by weight of a plasticizer having a solidification point not higher than −20° C. per 100 parts by weight of the whole polyol component.

In another aspect of this invention, there is also provided a process for the production of a shock-absorbing polyurethane foam. The process comprises reacting a mixed polyol and a polyisocyanate in the presence of 5–150 parts by weight of a plasticizer having a solidification point not higher than −20° C. per 100 parts by weight of the mixed polyol, said mixed polyol having an average hydroxyl number of 130–250 and composed at least of 20–70 parts by weight of a low-molecular polyol having a molecular weight of 300–500 and 80–30 parts by weight of a high-molecular polyol having a molecular weight of 1,500–8,000 per 100 parts by weight of the mixed polyol.

The polyurethane foam of this invention is soft and flexible and has low resilience. Moreover, these properties vary only a little with the temperature, so that it shows excellent shock-absorbing properties over a wide range of temperatures. It can therefore be used for applications in which conventional shock-absorbing materials are not usable satisfactorily, for example, athletic protectors, stadium fences, footwear, hospital beds, conveyors for weight-dependent or size-dependent fruit grading machines, toys, dolls, cushioning materials for automobiles, vibration dampers, sound-absorbing and soundproofing materials, and cushioning materials. Compared with the conventional shock-absorbing materials, the shock-absorbing material of this invention has broader applicability along with excellent shock-absorbing properties.

The process of this invention can produce the above-described excellent polyurethane foam without failure.

BRIEF DESCRIPTION OF THE DRAWINGS

The above and other objects, features and advantages of the present invention will become apparent from the following description of the invention and the appended claims, taken in conjunction with the accompanying drawings, in which:

DETAILED DESCRIPTION OF THE INVENTION AND PREFERRED EMBODIMENTS

Figure 1:
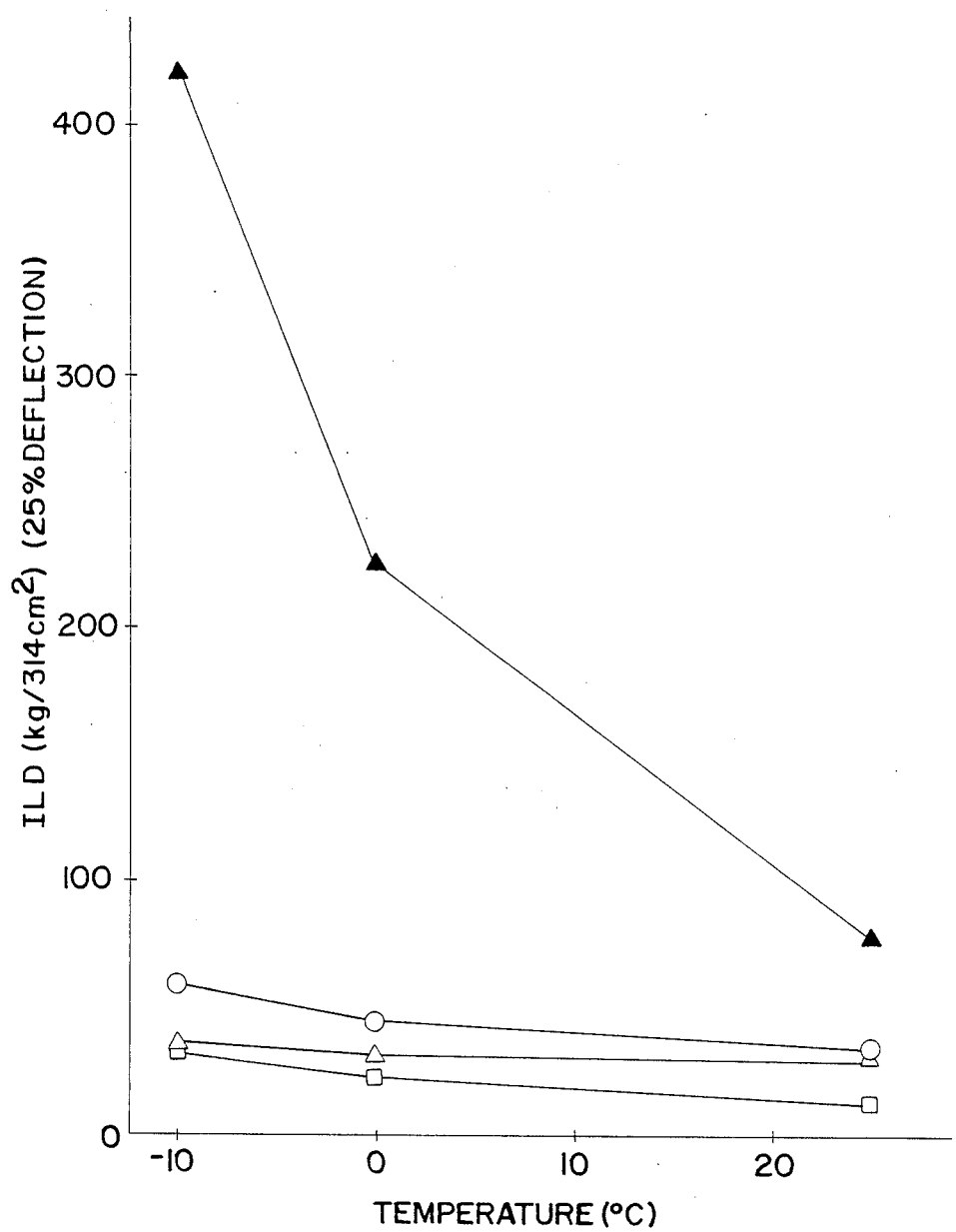
FIG. 1 diagrammatically illustrates, as a function of temperature, the indentation load deflection (ILD) of each of the foams obtained in Examples 1 and 6 and Comparative Examples 1 and 5.

Preferably, the low-molecular and high-molecular polyols can be obtained by adding a single alkylene oxide such as ethylene oxide, propylene oxide or butylene oxide to a compound, which usually contains 2–8 active hydrogen atoms as an initiator, or by adding two or more of these alkylene oxides at random or in blocks to the compound to give molecular weights of 300–500 and 1,500–8,000, respectively. Illustrative examples of the compound containing two or more active hydrogen atoms as an initiator include water, ethylene glycol, propylene glycol, butylene glycol, hexylene glycol, diethylene glycol, dipropylene glycol, glycerin, trimethylolpropane, 1,2,6-hexanetriol, triethanolamine, pentaerythritol, ethylenediamine, tolylenediamine, diphenylmethanediamine, tetramethylolcyclohexane, methyl glucoside, 2,2,6,6-tetrakis-(hydroxymethyl)cyclohexanol, diethylenetriamine, sorbitol, mannitol, dulcitol, and sucrose. They may be used either singly or in combination.

If the average molecular weight of the low-molecular polyol is smaller than 300, the resultant polyurethane foam has high resilience although its physical properties change only a little with the temperature (i.e., its temperature sensitive characteristics are low). If it exceeds 500, the resultant polyurethane foam has low resilience and softness and flexibility at room temperature but becomes extremely hard at low temperatures, and its physical properties change to extremely large extents with the temperature (i.e., its temperature sensitive characteristics are extremely high). If the average molecular weight of the high-molecular polyol is smaller than 1,500, the resultant polyurethane foam has softness and flexibility at room temperature but when the temperature drops, it becomes harder. It therefore has high temperature sensitivity. Average molecular weights greater than 8,000 result in difficult control of foaming. It is necessary to contain at least these low-molecular and high-molecular polyols in amounts of 20–70 parts by weight and 80–30 parts by weight, respectively, per 100 parts of the whole polyol component. One or more polyols other than the above-described polyols may also be contained as polyol component or components. The total content of such other polyols may preferably be less than 50 parts by weight, especially 30 parts by weight or less, in other words, the low-molecular and high-molecular polyols may preferably amount in combination to at least 50 parts, especially at least 70 parts by weight of the mixed polyol. If the total content of the polyol or polyols other than the low-molecular and high-molecular polyols is 50 parts by weight or more per 100 parts by weight of the whole polyol component, in other words, if the total content of the low-molecular and high-molecular polyols is less than 50 parts by weight, or if the content of the low-molecular or high-molecular polyol exceeds the upper limit of the corresponding range described above even when the total content of the polyol or polyols other than the low-molecular and high-molecular polyols is less than 50 parts by weight per 100 parts by weight of the whole polyol component, it is difficult to obtain a stable foam, or even if the resultant foam has flexibility at room temperature, it becomes harder at low temperatures or it has high resilience and small shock-absorbing properties on the contrary. If the average hydroxyl number of the mixed polyol containing the low-molecular and high-molecular polyols is smaller than 130, the resulting polyurethane foam has low temperature sensitivity but has high resilience and inferior shock-absorbing ability. If the average hydroxyl number of the mixed polyol exceeds 250, the resulting polyurethane foam has high temperature sensitivity so that it has shock-absorbing properties at room temperature but becomes very hard and has extremely inferior shock-absorbing properties when the temperature drops.

The polyurethane foam of this invention contains a plasticizer having a solidification point not higher than $-20°$ C., preferably not higher than $-50°$ C. in an amount of 5–150 parts by weight, preferably 5–50 parts by weight per 100 parts by weight of the whole polyol component. As such a plasticizer, it is possible to use, for example, a dibasic acid ester such as dioctyl adipate or dibutyl maleate; an alkyl phosphate such as trioctyl phosphate or tributyl phosphate; a halogenated alkyl phosphate such as trichloroethyl phosphate; an aromatic phosphoric ester such as cresyl diphenyl phosphate; or a phosphoric ester such as tributoxyethyl phosphate. These plasticizers may be used either singly or in combination. The amount of the plasticizer to be added may be suitably chosen from a range of 5–150 parts by weight depending on the composition of the polyol component, i.e., the mixing ratio of the low-molecular polyol to the high-molecular polyol and the indentation load deflection (ILD) desired for the resulting foam. If the content of the plasticizer is less than 5 parts by weight, the resultant polyurethane does not have sufficient softness and flexibility and is hence inferior in practical utility. On the other hand, any plasticizer contents higher than 150 parts by weight inhibit the reaction between the polyol and polyisocyanate, thereby making it difficult to obtain a satisfactory polyurethane foam. The plasticizer may be added, for example, to the polyol in advance upon reaction of the polyol and polyisocyanate.

The polyurethane foam according to this invention can be obtained, for example, by reacting the above polyol component with a polyisocyanate in the presence of the above plasticizer, foaming agent and catalyst. No particular limitation is imposed on the polyisocyanate so long as it is generally used for the production of general polyurethane foams. It is possible to use, for example, the 2,4-isomer or 2,6-isomer of tolylene diisocyanate or a mixture thereof, diphenylmethane diisocyanate, hexamethylene diisocyanate, naphthalene diisocyanate, or the like. Although two or more of these polyisocyanates may also be used in combination, it is preferable from the standpoint of control of the foaming to use a 80:20 to 65:35 mixture (by weight) of the 2,4-isomer and 2,6-isomer of tolylene diisocyanate. No particular limitation is imposed on the reaction ratio of the mixed polyol to the polyisocyanate. It is however preferred to react them at an NCO/OH ratio of 0.90–1.15 in view of the shape restoration characteristics of the resulting foam after compression and the stability at the time of foaming.

Exemplary foaming agents usable for the production of the foam of this invention include water and low-boiling halogenated hydrocarbons such as Freon-11 (trade name) and methylene chloride. They may be used either singly or in combination. As a catalyst, it is possible to use any one of amine and similar catalysts which are employed for the production of general urethane foams. Although not applicable to all instances, foams having a closed-cell structure tend to occur where a plasticizer is used in a small amount and a mixed polyol having a higher average hydroxyl number is employed. In such cases, it is preferable to use a catalyst containing at least a tertiary amine salt represented by the following formula (a):

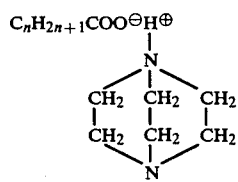

(a)

wherein n is an integer of at least 0. Use of such a catalyst containing such a tertiary amine salt allows the polymerization to proceed in a well-balanced manner and hence facilitates the control of the reaction, whereby a flexible foam of an open-cell structure can be obtained with ease. The amount of the tertiary amine salt to be used varies depending on the composition of the mixed polyol and may be determined as desired depending on the composition. In addition, combined use of calcium carbonate can readily provide a flexible foam of an open-cell structure. Addition of calcium carbonate in a large amount however involves a potential problem that certain physical properties of the resulting foam may be adversely affected. It is therefore preferable to limit the amount of calcium carbonate within about 1-20 parts by weight per 100 parts by weight of the whole polyol component.

Conventional foam stabilizers can be used. Foam stabilizers of the organosilicon type such as organopolysiloxane-polyoxyalkylene copolymers may be mentioned by way of example.

Upon production of the foam of this invention, it is also possible to add one or more flame retardants, such as trixylenyl phosphate, triphenyl phosphate, xylenyl diphenyl phosphate, octyl diphenyl phosphate, tricresyl phosphate, trichloropropyl phosphate, tris(tribromophenyl) phosphate, hexabromobenzene and/or chlorinated paraffin; one or more fillers, such as hydrogenated castor oil, starch, barium sulfate, aluminum hydroxide and/or carbon black; one more pigments; etc. as needed.

In addition, the use of the specific tertiary amine as a catalyst upon production of the foam of this invention has made it possible to use a plasticizer in a smaller proportion and further, assures the provision of a flexible foam of an open-cell structure even when a polyol having a high average hydroxyl number is employed.

This invention will hereinafter be described more specifically by the following examples.

EXAMPLES 1-13 AND COMPARATIVE EXAMPLES 1-8

Figure 2:
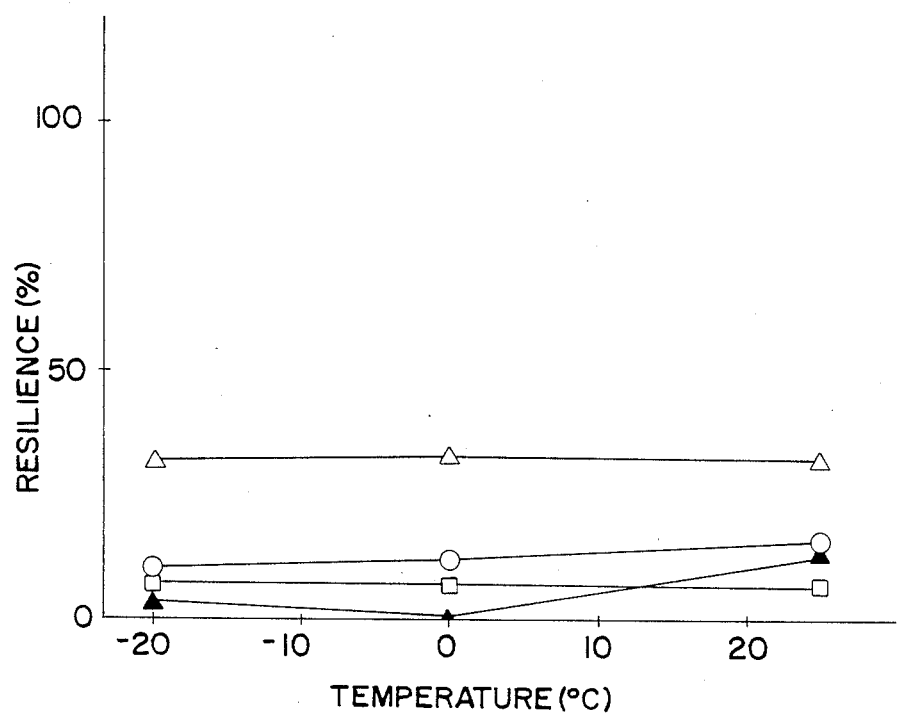
FIG. 2 diagrammatically shows, as a function of temperature, the resilience of each of foams obtained in Examples 1 and 6 and Comparative Examples 1 and 5.

Polyurethane foams were each obtained by adding the corresponding plasticizer, water (foaming agent), catalyst, foam stabilizer, etc. shown in Table 1 to the corresponding polyol also given in the same table and then reacting the polyol with a 65:35 (by weight) mixed polyisocyanate of the 2,4- and 2,6-isomers of tolylene diisocyanate at the corresponding NCO/OH index depicted in the same table. Physical properties of the foams thus obtained are summarized in Table 2. The foams obtained in Examples 12 and 13 partly contained a closed-cell structure. As examples showing the characteristic features of the present invention, the indentation load deflection [ILD, kg/314 cm$^2$ (25% reflection)-]of each of the foams obtained in Examples 1 and 6 and Comparative Examples 1 and 5 is shown diagrammatically as a function of temperature in FIG. 1 and the resilience of each of foams obtained in Examples 1 and 6 and Comparative Examples 1 and 5 is illustrated diagrammaticaLly as a function of temperature in FIG. 2.

In these drawings, circles (○) represent the foam of Example 1, squares (□) the foam of Example 6, triangles (△) the foam of Comparative Example 1, and solid triangles (▲) the foam of Comparative Example 5, respectively.

TABLE 1

| | Example | | | | | | | | | | | | |
|---|---|---|---|---|---|---|---|---|---|---|---|---|---|
| | 1 | 2 | 3 | 4 | 5 | 6 | 7 | 8 | 9 | 10 | 11 | 12 | 13 |
| Glycerin | — | — | — | — | — | — | — | — | — | — | — | — | — |
| Polyol-1[1] | — | — | — | — | — | — | — | — | — | — | — | — | — |
| Polyol-2[2] | — | — | — | — | — | — | — | — | — | — | — | — | — |
| Polyol-3[3] | — | — | — | 36.4 | — | — | — | 36.4 | — | 36.4 | — | 36.4 | — |
| Polyol-4[4] | 31 | 35 | 37 | — | — | 46 | — | — | 54 | — | 50 | — | 50 |
| Polyol-5[5] | — | — | — | — | 30 | — | 20 | — | — | — | — | — | — |
| Polyol-6[6] | — | — | — | — | — | — | — | — | — | — | — | — | — |
| Polyol-7[7] | — | — | — | — | — | 54 | — | — | — | — | — | — | — |
| Polyol-8[8] | 69 | — | — | 63.6 | 70 | — | 80 | 63.6 | — | 63.6 | 50 | 63.6 | 50 |
| Polyol-9[9] | — | 65 | — | — | — | — | — | — | — | — | — | — | — |
| Polyol-10[10] | — | — | 63 | — | — | — | — | — | 46 | — | — | — | — |
| Average hydroxyl number of polyol | 169 | 175 | 177 | 240 | 174 | 239 | 135 | 240 | 243 | 240 | 240 | 240 | 240 |
| TBXP[11] | — | 8 | — | — | — | — | — | — | — | — | — | — | — |
| TBP[12] | — | — | 7 | — | — | — | — | — | — | — | — | — | — |
| TOP[13] | 8 | — | — | 25 | 25 | 25 | 10 | — | 150 | 25 | 25 | 25 | 25 |
| DOA[14] | — | — | — | — | — | — | — | — | — | — | — | — | — |
| CDP[15] | — | — | — | — | — | — | — | 50 | — | — | — | — | — |
| TDCP[16] | — | — | — | — | — | — | — | — | — | — | — | — | — |
| Water | 1.5 | 1.5 | 1.5 | 1.5 | 1.5 | 1.5 | 1.5 | 1.5 | 1.5 | 1.5 | 1.5 | 1.5 | 1.5 |
| Catalyst A[17] | 0.8 | 0.8 | 0.8 | — | 1.0 | — | 0.3 | — | 4.0 | — | — | 1.0 | 1.5 |

TABLE 1-continued

|  | | | | | | | | | | | | | |
|---|---|---|---|---|---|---|---|---|---|---|---|---|---|
| Catalyst B[18] | 1.5 | 1.5 | 1.2 | 4.0 | 3.0 | 3.0 | — | 3.0 | — | 3.0 | 3.0 | 8.5 | 7.0 |
| Catalyst C[19] | — | — | — | — | — | — | 0.1 | — | — | — | — | — | — |
| Catalyst D[20] | — | — | — | 1.0 | — | 1.0 | — | 1.5 | — | 1.5 | 1.5 | — | — |
| Calcium carbonate | — | — | — | — | — | 5 | — | — | — | 10 | 10 | — | — |
| Foam stabilizer A[21] | 1.5 | 1.5 | 1.5 | 1.0 | 1.0 | 0.2 | 0.6 | 0.3 | 1.0 | 0.2 | 0.2 | 1.0 | 1.0 |
| Foam stabilizer B[22] | — | — | — | — | — | 1.0 | — | 1.0 | — | 1.0 | 1.0 | — | — |
| NCO/OH Index | 100 | 100 | 100 | 95 | 100 | 95 | 100 | 95 | 95 | 95 | 95 | 95 | 95 |

| | Comparative Example | | | | | | | |
|---|---|---|---|---|---|---|---|---|
| | 1 | 2 | 3 | 4 | 5 | 6 | 7 | 8 |
| Glycerin | 6.5 | — | — | — | — | — | — | — |
| Polyol-1[1] | — | 15 | — | — | — | — | — | — |
| Polyol-2[2] | — | — | 21 | 22 | — | — | — | — |
| Polyol-3[3] | — | — | — | — | — | — | — | — |
| Polyol-4[4] | — | — | — | — | — | — | 17 | 68.9 |
| Polyol-5[5] | — | — | — | — | — | — | — | — |
| Polyol-6[6] | — | — | — | — | 82 | 61 | — | — |
| Polyol-7[7] | — | — | — | — | — | — | — | — |
| Polyol-8[8] | 93.5 | — | — | — | — | — | — | — |
| Polyol-9[9] | — | 85 | 79 | — | 18 | — | — | — |
| Polyol-10[10] | — | — | — | 78 | — | 39 | 83 | 31.1 |
| Average hydroxyl number of polyol | 171 | 169 | 175 | 175 | 240 | 160 | 100 | 300 |
| TBXP[11] | — | — | — | — | — | — | — | — |
| TBP[12] | — | — | — | — | — | — | — | — |
| TOP[13] | — | — | — | — | — | — | 10 | 100 |
| DOA[14] | — | — | 12 | — | — | — | — | — |
| CDP[15] | 12 | 12 | — | — | — | — | — | — |
| TDCP[16] | — | — | — | 20 | — | — | — | — |
| Water | 1.5 | 1.5 | 1.5 | 1.5 | 2.4 | 2.4 | 1.5 | 1.5 |
| Catalyst A[17] | 0.8 | 0.8 | 0.8 | 0.8 | 1.5 | 3.0 | 1.0 | 2.0 |
| Catalyst B[18] | 1.2 | 1.2 | 1.2 | 1.2 | 2.0 | — | 3.0 | 3.0 |
| Catalyst C[19] | — | — | — | — | — | — | — | — |
| Catalyst D[20] | — | — | — | — | — | — | — | — |
| Calcium carbonate | — | — | — | — | — | — | — | — |
| Foam stabilizer A[21] | 1.5 | 1.5 | 1.5 | 1.5 | 1.0 | 1.0 | 1.0 | 1.0 |
| Foam stabilizer B[22] | — | — | — | — | — | — | — | — |
| NCO/OH Index | 100 | 100 | 100 | 100 | 95 | 95 | 100 | 95 |

TABLE 2

| | | Example | | | | | | | | | | | | |
|---|---|---|---|---|---|---|---|---|---|---|---|---|---|---|
| | | 1 | 2 | 3 | 4 | 5 | 6 | 7 | 8 | 9 | 10 | 11 | 12 | 13 |
| Density, kg/m$^3$ | | 54.5 | 51.8 | 58.2 | 53.6 | 63.9 | 45.0 | 52.4 | 77.2 | 114.2 | 53.6 | 48.2 | 58.6 | 53.2 |
| ILD* | −10° C. | 59.7 | 82.2 | 38.6 | 75.0 | 62.1 | 32 | 53 | 99.7 | 57 | 75.0 | 72.4 | 81.0 | 78.8 |
| kg/314 cm$^2$ | 0° C. | 44.0 | 62.1 | 35.0 | 65.3 | 49.2 | 23 | 41 | 64.1 | 43 | 65.3 | 62.4 | 70.5 | 68.0 |
| (25% ref.) | 25° C. | 34.2 | 53.0 | 33.5 | 47.3 | 31.9 | 12 | 33 | 45.2 | 18 | 47.3 | 42.0 | 51.0 | 45.6 |
| Resilience* | −20° C. | 10 | 11 | 15 | 8 | 10 | 7 | 1 | 5 | 6 | 8 | 12 | 9 | 12 |
| % | 0° C. | 12 | 14 | 18 | 10 | 12 | 7 | 4 | 7 | 10 | 10 | 12 | 12 | 13 |
| | 25° C. | 16 | 18 | 20 | 14 | 15 | 7 | 10 | 12 | 13 | 14 | 15 | 15 | 16 |
| Hysteresis loss, % | 25° C. | 61.6 | 73.7 | 74.3 | 75.6 | 71.0 | 76.2 | 65.0 | 71.8 | 83.9 | 75.6 | 75.0 | 73.5 | 72.8 |

| | | Comparative Example | | | | | | | |
|---|---|---|---|---|---|---|---|---|---|
| | | 1 | 2 | 3 | 4 | 5 | 6 | 7 | 8 |
| Density, kg/m$^3$ | | 57 | 59 | 56 | 60 | 33.3 | 36.4 | 58.7 | 89.3 |
| ILD* | −10° C. | 34.1 | 32.4 | 21.5 | 16.0 | 420 | 350 | 19 | 210 |
| kg/314 cm$^2$ | 0° C. | 30.5 | 30.8 | 18.1 | 15.9 | 225 | 132 | 17 | 140 |
| (25% ref.) | 25° C. | 29.3 | 30.0 | 17.5 | 13.0 | 78 | 51.5 | 16 | 48 |
| Resilience* | −20° C. | 32 | 24 | 25 | 24 | 3 | 2 | 20 | 12 |
| % | 0° C. | 33 | 25 | 30 | 26 | 0 | 0 | 25 | 12 |
| | 25° C. | 32 | 25 | 30 | 27 | 13 | 1 | 31 | 14 |
| Hysteresis loss, % | 25° C. | 52.3 | 54.7 | 39.2 | 38.0 | 94.3 | 90.9 | 52.4 | 85.8 |

*Determined by a similar method to JIS K6401.

In Table 1, the respective reactants and additives indicated by numbers or letters are as follows:

(1) Polyoxypropylenetriol (average molecular weight: 190).
(2) Polyoxypropylenetriol (average molecular weight: 250).
(3) Polyoxypropylenetriol (average molecular weight: 300).
(4) Polyoxypropylenetriol (average molecular weight: 400).
(5) Polyoxypropylenetriol (average molecular weight: 500).
(6) Polyoxypropylenetriol (average molecular weight: 700).
(7) Polyoxypropylenetriol (average molecular weight: 2000).
(8) Polyoxypropylenetriol (average molecular weight: 3000).
(9) Polyoxypropylenetriol (average molecular weight: 4000).
(10) Polyoxypropylenetriol (average molecular weight: 5000).

(11) Trade name for tributoxyethyl phosphate produced and marketed by Daihachi Chemical Industry Co., Ltd.
(12) Tributyl phosphate.
(13) Trioctyl phosphate.
(14) Dioctyl adipate.
(15) Cresyl diphenyl phosphate.
(16) Tris(dichloropropyl) phosphate.
(17) 33% triethylene diamine/dipropylene glycol.
(18) N-ethylmorpholine.
(19) Stannous octoate.
(20) Tertiary amine salt ("Dabco 8154", trade name; product of Sankyo Air Products Company Limited).
(21) "F-114" (trade name; product of Shin-Etsu Chemical Co., Ltd.).
(22) "PRX-607" (trade name; product of Toray-Silicone Co., Ltd.).

We claim:

1. A shock-absorbing polyurethane foam comprising a polyol component and a polyisocyanate component, characterized in that the polyol component is a mixed polyol having an average hydroxyl number of 130-250 and composed at least of 20-70 parts by weight of a low-molecular polyol having a molecular weight of 300-500 and 80-30 parts by weight of a high-molecular polyol having a molecular weight of 1,500-8,000 per 100 parts by weight of the whole polyol component; and the foam contains 5-150 parts by weight of a plasticizer having a solidification point not higher than −20° C. per 100 parts by weight of the whole polyol component.

2. The foam as claimed in claim 1, wherein the average molecular weight of the high-molecular polyol is 2,000-6,000.

3. The foam as claimed in claim 1, wherein each of the low-molecular and high-molecular polyols is a polyol obtained by adding at least one alkylene oxide to a compound containing at least two active hydrogen atoms.

4. The foam as claimed in claim 1, wherein the low-molecular and high-molecular polyols amount in combination to at least 50 parts by weight of the mixed polyol.

5. The foam as claimed in claim 1, wherein the low-molecular and high-molecular polyols amount in combination to at least 70 parts by weight of the mixed polyol.

6. The foam as claimed in claim 1, wherein a plasticizer having a solidification point not higher than −50° C. is contained in an amount of 5-50 parts by weight per 100 parts by weight of the whole polyol component.

7. A process for the production of a shock-absorbing polyurethane foam, characterized in that said process comprises reacting a mixed polyol and a polyisocyanate in the presence of 5-150 parts by weight of a plasticizer having a solidification point not higher than −20° C. per 100 parts by weight of the mixed polyol, said mixed polyol having an average hydroxyl number of 130-250 and composed at least of 20-70 parts by weight of a low-molecular polyol having a molecular weight of 300-500 and 80-30 parts by weight of a high-molecular polyol having a molecular weight of 1,500-8,000 per 100 parts by weight of the mixed polyol.

8. The process as claimed in claim 7, wherein the average molecular weight of the high-molecular polyol is 2,000-6,000.

9. The process as claimed in claim 7, wherein each of the low-molecular and high-molecular polyols is a polyol obtained by adding at least one alkylene oxide to a compound containing at least two active hydrogen atoms.

10. The process as claimed in claim 7, wherein the low-molecular and high-molecular polyols amount in combination to at least 50 parts by weight of the mixed polyol.

11. The process as claimed in claim 7, wherein the low-molecular and high-molecular polyols amount in combination to at least 70 parts by weight of the mixed polyol.

12. The process as claimed in claim 7, wherein the reaction is conducted in the presence of 5-50 parts by weight of a plasticizer having a solidification point not higher than −50° C. per 100 parts by weight of the mixed polyol.

13. The process as claimed in claim 7, wherein the polyisocyanate is a mixture of the 2,4-isomer and 2,6-isomer of tolylene diisocyanate at a weight ratio of from 80:20 to 65:35.

14. The process as claimed in claim 7, wherein the mixed polyol and polyisocyanate are reacted at an NCO/OH ratio of 0.90-1.15.

15. The process as claimed in claim 7, wherein the mixed polyol and polyisocyanate are reacted in the presence of calcium carbonate.

16. The process as claimed in claim 15, wherein calcium carbonate is added in an amount of 1-20 parts by weight per 100 parts by weight of the mixed polyol.

17. The process as claimed in claim 7, wherein a tertiary amine salt represented by the following formula (a) is used as a reaction catalyst:

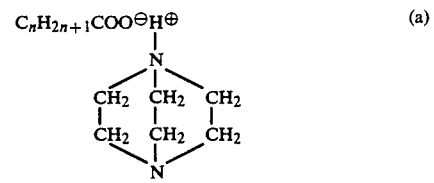

(a)

wherein n is an integer of at least 0.

18. The process as claimed in claim 17, wherein the mixed polyol and polyisocyanate are reacted in the presence of calcium carbonate.

19. The process as claimed in claim 18, wherein calcium carbonate is added in an amount of 1-20 parts by weight per 100 parts by weight of the mixed polyol.

20. The foam as claimed in claim 1 wherein the foam is flexible.

21. The foam as claimed in claim 20 wherein the foam is an open-cell foam.

22. The foam as claimed in claim 1 wherein the cell is an open-cell foam.

23. An automotive cushioning material formed from the foam of claim 1.

* * * * *